US006841976B1

(12) United States Patent
Sen et al.

(10) Patent No.: US 6,841,976 B1
(45) Date of Patent: Jan. 11, 2005

(54) MULTI-LINE POWER FLOW TRANSFORMER FOR COMPENSATING POWER FLOW AMONG TRANSMISSION LINES

(76) Inventors: Kalyan Sen, 126 Pauline Dr., Monroeville, PA (US) 15146; Mey Ling Sen, 126 Pauline Dr., Monroeville, PA (US) 15146

( * ) Notice: Subject to any disclaimer, the term of this patent is extended or adjusted under 35 U.S.C. 154(b) by 0 days.

(21) Appl. No.: 10/317,635

(22) Filed: Dec. 12, 2002

Related U.S. Application Data
(60) Provisional application No. 60/342,142, filed on Dec. 19, 2001.

(51) Int. Cl.[7] .............................. G05F 1/100; G05F 1/70
(52) U.S. Cl. ...................... 323/216; 323/209; 323/343
(58) Field of Search ........................ 323/205, 208–211, 323/213, 215–218, 255, 256, 258, 300, 301, 340–343, 361

(56) References Cited

U.S. PATENT DOCUMENTS

| | | | |
|---|---|---|---|
| 1,873,777 A | 8/1932 | Mercereau et al. | |
| 1,898,828 A | 2/1933 | Green | 323/216 |
| 2,812,488 A | 11/1957 | Wright | 323/47 |
| 3,323,039 A | 5/1967 | Kusko | 323/45 |
| 3,454,866 A | 7/1969 | Beck et al. | 323/43.5 |
| 3,621,374 A | 11/1971 | Kettler | 323/43.5 |
| 3,690,739 A | 9/1972 | Prescott | 323/43.5 |
| 3,732,486 A | 5/1973 | Schoendube | 323/43.5 |
| 3,818,321 A | 6/1974 | Willner et al. | 323/43.5 |
| 3,978,395 A | 8/1976 | Legnaioli | 323/43.5 |
| 4,156,174 A | 5/1979 | Specht | 323/43.5 |
| 4,220,911 A | 9/1980 | Rosa | 323/43.5 |
| 4,429,269 A | 1/1984 | Brown | 323/301 |
| 4,549,254 A | 10/1985 | Kissel | 363/21 |
| 4,622,513 A | 11/1986 | Stich | 323/343 |
| 4,853,608 A | 8/1989 | Schrade | 323/258 |
| 4,896,092 A | * 1/1990 | Flynn | 323/258 |
| 5,166,597 A | * 11/1992 | Larsen et al. | 323/215 |
| 5,355,295 A | 10/1994 | Brennen | 363/40 |
| 5,402,057 A | 3/1995 | D'Aquila et al. | 323/211 |
| 5,408,171 A | * 4/1995 | Eitzmann et al. | 323/258 |

(List continued on next page.)

OTHER PUBLICATIONS

Sen, STATCOM–Static synchronous COMpensator: Theory, Modeling and Applications, *IEEE Power Engineering Society Conference*, 1999 Winter Meeting, Jan. 31–Feb. 4, 1999, pp. 1177–1183.

Sen, *SSSC–Static Synchronous Series Compensator: Theory, Modeling, and Applications*, IEEE Transactions on Power Delivery, Jan. 1998, 13(1).

Gyugyi, Schauder and Sen, SSSC–Static Synchronous Series Compensator: A Solid–State Approach to the Series Compensation of Transmission Lines, *IEEE Transactions on Power Delivery*, Jan. 1997, 12(1).

Sen and Stachy, UPFC–Unified Power Flow Controler: Theory, Modeling and Applications, *IEEE Transactions on Power Delivery*, Oct. 1998, 13(4).

*Primary Examiner*—Matthew V. Nguyen
(74) *Attorney, Agent, or Firm*—Woodcock Washburn LLP

(57) ABSTRACT

A multi-line power flow transformer implements power flow control among multiple transmission lines in an n-phase power system. The transformer has an exciter unit with n primary windings. Each primary winding is on a core and receives a transmission voltage of a respective one of the phases of the power system. The transformer also has a series compensating unit for each transmission line. Each series compensating unit has n secondary windings on the core of each primary winding. Each secondary winding has a voltage induced thereon by the corresponding primary winding. For each phase, the secondary windings of the series compensating unit assigned to the phase are coupled in series to sum the induced voltages formed thereon. The summed voltage is a compensating voltage for the phase.

22 Claims, 12 Drawing Sheets

U.S. PATENT DOCUMENTS

| | | | |
|---|---|---|---|
| 5,545,971 A | 8/1996 | Gomez et al. | 323/259 |
| 5,654,627 A | 8/1997 | Shimazu et al. | 323/258 |
| 5,666,277 A * | 9/1997 | Bjorklund et al. | 363/64 |
| 5,754,035 A * | 5/1998 | Sen | 323/207 |
| 5,907,236 A | 5/1999 | James | 323/255 |
| 5,969,511 A | 10/1999 | Asselman et al. | 323/258 |
| 6,335,613 B1 | 1/2002 | Sen et al. | 323/216 |
| 6,384,581 B1 | 5/2002 | Sen et al. | 323/211 |
| 6,396,248 B1 | 5/2002 | Sen et al. | 323/209 |
| 6,420,856 B1 | 7/2002 | Sen et al. | 323/209 |

* cited by examiner

MULTI-LINE POWER FLOW TRANSFORMER FOR COMPENSATING POWER FLOW AMONG TRANSMISSION LINES

CROSS-REFERENCE TO RELATED APPLICATIONS

This application claims the benefit of U.S. Provisional Application No. 60/342,142, filed Dec. 19, 2001 and entitled "MULTI-LINE POWER FLOW TRANSFORMER FOR COMPENSATING POWER FLOW AMONG TRANSMISSION LINES", hereby incorporated by reference in its entirety.

This application is related to: U.S. patent application No. 09/728,982, now U.S. Pat. No 6,396,248, entitled "VERSATILE POWER FLOW TRANSFORMERS FOR COMPENSATING POWER FLOW IN A TRANSMISSION LINE"; U.S. patent application No. 09/728,985, now U.S. Pat. No. 6,420,856, entitled "VERSATILE POWER FLOW TRANSFORMERS FOR COMPENSATING POWER FLOW IN A TRANSMISSION LINE"; U.S. patent application No. 09/729,006, now U.S. Pat. No. 6,335,613, entitled "VERSATILE POWER FLOW TRANSFORMERS FOR COMPENSATING POWER FLOW IN A TRANSMISSION LINE"; and U.S. patent application No. 09/728,978, now U.S. Pat. No. 6,384,581, entitled "VERSATILE POWER FLOW TRANSFORMERS FOR COMPENSATING POWER FLOW IN A TRANSMISSION LINE", each of which is hereby incorporated by reference.

FIELD OF THE INVENTION

The present invention relates to a power flow transformer that transfers real and reactive power between transmission lines in a multi-line power transmission system. More particularly, the present invention relates to such a power flow transformer that is simple, versatile, and relatively inexpensive.

BACKGROUND OF THE INVENTION

Electric power flow through an alternating current transmission line is a function of the line impedance, the magnitudes of the sending-end and the receiving-end voltages, and the phase angle between such voltages, as shown in FIG. 1. In order to regulate the voltage at any point in a transmission line, an in-phase or an out-of-phase voltage in series with the line is injected. FIG. 2 shows the shunt compensating transformer scheme for voltage regulation in a transmission line. The exciter unit consists of a three-phase Y-connected primary winding, which is impressed with the initial line voltage, $v_1'$ (i.e., $v_{1A}'$, $v_{1B}'$, and $v_{1C}'$). The shunt-compensating unit consists of a total of six secondary windings (two windings in each phase for a bipolar voltage injection). The line is regulated at a voltage, $v_1$ by adding a compensating voltage, $v_{11'}$, either in- or out-of-phase with the line voltage. The bipolar compensating voltage in any phase is induced in two windings placed on the same phase of the transformer core. To control the shunt compensating unit, a reference voltage $V_1^*$ is fed to a gate pattern logic which monitors the magnitude $V_1'$ of the exciter voltage, $v_1'$, and determines the number of turns necessary on the shunt compensating unit. Based on this calculation, an appropriate thyristor valve is switched on in a tap changer (FIG. 3), which puts the required number of turns in series with the line.

FIG. 3 shows the schematic diagram of a thyristor-controlled tap changer. A transformer winding is tapped at various places. Each of the tapped points is connected to one side of a back-to-back thyristor (triac) switch. The other sides of all the thyristor switches are connected together at point A. Depending on which thyristor is on, the voltage between points A and B can be varied between zero and the full winding voltage with desired steps in between. In a mechanical version of this arrangement, a load tap changer connects with one of a number of taps to give a variable number of turns between the connected tap and one end of the winding.

The effective angle of a transmission line is varied by using a Phase Shifting Transformer, which is also known as a Phase Angle Regulator (PAR). A PAR injects a voltage in series with the transmission line and in quadrature with the phase-to-neutral voltage of the transmission line as shown in FIG. 4A. The series injected voltage introduces a phase shift whose magnitude in radians varies with the magnitude of the series-injected voltage input where the phase-to-neutral voltage of the transmission line is the base voltage. In a typical configuration, a PAR consists of two transformers (FIG. 4B). The first transformer in the exciter unit is a regulating transformer that is shunt connected with the line. The first, regulating transformer primary windings are excited from the line voltage and a voltage is induced in the secondary windings. A voltage with variable magnitude and in quadrature with the line voltage is generated from the phase-to-phase voltage of the induced voltage of the first transformer using taps. For series injection of this voltage, an electrical isolation is necessary.

The second transformer in the series unit is a series transformer that is excited from the phase-to-phase voltage of the regulating transformer and its induced voltage is connected in series with the line. Since the series injection voltage is only a few percent of the line voltage, the series transformer can be a step-down transformer. The primary winding of the series transformer as well as the secondary winding of the regulating transformer can be high voltage and low current rated so that the taps can operate normally at low current and can ride through high fault current.

The impedance of the transmission line is typically inductive; accordingly, power flow can be decreased by inserting an additional inductive reactance in series with the transmission line, thereby increasing the effective reactance of the transmission line between its two ends. The power flow can also be increased by inserting an additional capacitive reactance in series with the transmission line, thereby decreasing the effective reactance of the transmission line between its two ends. The indirect way to emulate an inductive or a capacitive reactance is to inject a voltage in quadrature with the prevailing line current by using a Voltage Source Converter.

The characteristics of mechanically switched and Thyristor-controlled Power Flow Controllers are such that each controller can control only one of the three transmission parameters (voltage, impedance, and angle). Therefore, changing one parameter affects both the real and the reactive power flow in the transmission line.

The desired operation of an ideal power flow controller is described below. FIG. 5(a) shows a single line diagram of a simple transmission line with an inductive reactance, $X_L$, and a series insertion voltage, $V_{dq}$, connecting a sending-end voltage source, $V_s$, and a receiving-end voltage source, $V_r$, respectively. The voltage across the transmission line reactance, $X_L$, is $V_X = V_s - V_r - V_{dq} = I X_L$ where I is the current in the transmission line. Changing the insertion voltage, $V_{dq}$, in series with the transmission line can change the voltage, $V_X$, across the transmission line and, consequently, the line current and the power flow in the line will change.

Consider the case where $V_{dq}=0$ (FIG. 5(b)). The transmission line sending-end voltage, $V_s$, leads the receiving-end voltage, $V_r$, by an angle δ. The resulting current in the line is I; the real and the reactive power flow at the receiving end are P and Q, respectively. With an injection of $V_{dq}$ in series with the transmission line, the transmission line sending-end voltage, $V_o$, still leads the receiving-end voltage, $V_r$, but by a different angle $δ_1$ (FIG. 5(c)). The resulting line current and power flow change, as shown. With a larger amount of $V_{dq}$ injected in series with the transmission line, the transmission line sending-end voltage, $V_o$, now lags the receiving-end voltage, $V_r$, by an angle $δ_2$ (FIG. 5(d)). The resulting line current and the power flow now reverse. Notice that the injected series voltage, $V_{dq}$, is at any angle, Φ, with respect to the line current, I.

For a desired amount of real and reactive power flow in a line, the magnitude and the angle of the series injected voltage are varied. The compensating voltage, being at any angle with the prevailing line current, emulates in series with the transmission line a capacitor that increases the power flow in the line, an inductor that decreases the power flow in the line, a positive resistor that absorbs real power from the line and a negative resistor that delivers real power to the line.

Referring now to FIG. 6, a Versatile Power Flow Transformer (VPFT) is shown for implementing power flow control in a transmission line of a power transmission system. As shown, in the VPFT, the line voltage is applied across the primary windings 1A, 1B, 1C in the exciter unit (only winding 1A being shown). Each primary winding has three secondary windings in series, for a total of nine secondary windings—a1, c2 and b3 on the core of A-phase; b1, a2 and c3 on the core of B-phase; and c1, b2 and a3 on the core of C-phase. As seen, a compensating voltage for any phase is derived from the vectorial sum of the voltages induced in a three-phase winding set—a1, a2 and a3 for injection in A-phase; b1, b2 and b3 for injection in B-phase; and c1, c2 and c3 for injection in C-phase. Importantly, a tap is employed on each of the nine secondary windings so that each entity in each vectorial sum can be individually magnitudally varied. Each tap may be a mechanical or solid-state tap changer such as the tap changer of FIG. 3, e.g., although other types of taps may be employed.

For example, and more specifically, the voltage $V_{21A}$ (shown) is the sum of at least a tapped portion of the voltage across a1 as derived from A-phase, at least a tapped portion of the voltage across a2 as derived from B-phase, and at least a tapped portion of the voltage across a3 as derived from C-phase:

$$V_{21A}=\% \ x \ a1+\% \ y \ a2+\% \ z \ a3;$$

and voltage $V_{21A}$ is injected as a compensating voltage in line with $V_{1A}$ to produce compensated voltage $V_{2A}$:

$$V_{2A}=V_{21A}+V_{1A}.$$

Compensating voltages $V_{21B}$ for the B-phase and $V_{21C}$ for the C-phase are similarly produced:

$$V_{21B}=\% \ x \ b1+\% \ y \ b2+\% \ z \ b3;$$

$$V_{2B}=V_{21B}+V_{1B}.$$

$$V_{21C}=\% \ x \ c1+\% \ y \ c2+\% \ z \ c3;$$

$$V_{2C}=V_{21C}+V_{1C}.$$

Notably, a1, b1, and c1 should be substantially identical; a2, b2, and c2 should be substantially identical; and a3, b3, and c3 should be substantially identical. In addition, each of % x, % y, and % z should be substantially identical across the phases of the VPFT. Accordingly, the magnitude of the produced $V_{21A}$, $V_{21B}$, and $V_{21C}$ should be substantially identical; and $V_{21A}$, $V_{21B}$, and $V_{21C}$ should be substantially 120 degrees out of phase with each other, assuming that $V_{1A}$, $V_{1B}$, and $V_{1C}$ are substantially 120 degrees out of phase with each other. Accordingly, the transmission lines A, B, and C as compensated are substantially in balance.

FIG. 7 shows a control block diagram of a controller for controlling the series impedance emulation achieved by the VPFT of FIG. 6. The steps performed by such controller are as follows. An instantaneous 3-phase set of line voltages, $v_1$, (i.e., $v_{1A}$, $v_{1B}$, $v_{1C}$) is used to calculate the reference angle, Θ, which is phase-locked to the phase a of the line voltage, $v_{1A}$. From an instantaneous 3-phase set of measured line currents, i, the magnitude, I, and its relative angle, $Θ_{ir}$, with respect to the phase-lock-loop angle, Θ, are calculated. From the compensating resistance demand, R*, and the compensating reactance demand, X*, both externally supplied, the demanded impedance's magnitude, Z*, and angle, $Θ_z$, are calculated. The magnitude, I, of the line current multiplied by the compensating impedance demand, Z*, is the insertion voltage magnitude demand, $V_{dq}*$. The relative phase angle, β, of this insertion voltage demand is $Θ_{ir}+Θ_z$.

Once the desired series injection voltage, $V_{dq}*$, and its angle, β, are defined, the Tap Control Unit in FIG. 15 determines the contribution from each winding of a 3-phase set (a1, a2, and a3 for injection in A-phase; b1, b2, and b3 for injection in B-phase; and c1, c2, and c3 for injection in C-phase) to constitute $V_{dq}*$ in particular, from knowledge of the magnitude of the exciter voltage, $V_1$, the Tap Control Unit determines the number of turns necessary on each winding of the series-compensating unit. Based on this calculation, the appropriate taps are switched on via an appropriate mechanical or solid state tap changer (see FIG. 3, e.g.), which accordingly put the required number of turns in series with the line. In addition, a VPFT can regulate the line voltage by utilizing the unused portions of the transformer windings as a shunt compensating unit.

FIG. 8 shows a model of the basic VPFT of FIG. 6 as coupled to a simple power transmission system, and also a phasor diagram of the transmission system. As seen, in the system the sending-end voltage is $V_s$, the receiving-end voltage is $V_r$, the voltage across the line impedance $X_L$, is $V_X$, and the inserted voltage is $V_{dq}$, and has a controllable magnitude ($0 \leq V_{dq} \leq V_{dqmax}$) and angle ($0 \leq ρ \leq 360°$). The inserted voltage $V_{dq}$ is added to the fixed sending-end voltage, $V_s$, to produce the effective sending-end voltage, $V_o=V_s+V_{dq}$. The difference, $V_o-V_r$, provides the compensated voltage, $V_X$, across $X_L$. As angle ρ is varied over its full 360° range, the end of phasor $V_{dq}$ moves along a circle with its center located at the end of phasor $V_s$. The rotation of phasor $V_{dq}$ with angle ρ modulates both the magnitude and the angle of phasor $V_X$ and, therefore, both the transmitted real power, P, and the reactive power, Q, vary with ρ in a sinusoidal manner.

This process, of course, requires the compensating voltage, $V_{dq}$, to supply and absorb both real and reactive power, $P_{exch}$ and $Q_{exch}$, which are also sinusoidal functions of angle ρ, as shown in FIG. 8. The exchanged real power, $P_{exch}$, and reactive power, $Q_{exch}$, by the injected voltage source with the line are:

$$P_{exch}=V_{dq}*I=V_{dq} \ I \cos φ=V_d \ I, \text{ and}$$

$$Q_{dq}=V_{dq}\times I=V_{dq} \ I \sin φ=V_q \ I.$$

The exchanged real and reactive power, $P_{exch}$ and $Q_{exch}$, must flow through another source or sink. Since the compensating voltage is derived from the line voltage through a transformer action with the primary winding, the exchanged real and reactive power with the line must flow through the primary winding to the line. Since the series injected voltage is, typically, only a few percent of the line voltage, the shunt current would be the same few percent of the line current. The current through the exciter unit has both real and reactive components. The loading effect of these two currents on the power system network is independent of each other as shown.

In an alternate method of emulating in series with a transmission line for selective real and reactive flow in the line, a Voltage Source Converter (VSC)—based Unified Power Flow Controller (UPFC) is employed. A UPFC injects, in series with the line, a variable magnitude and variable angle voltage, thereby exchanging both real and reactive power with the line. The difference between a UPFC and a VPFT is that in a UPFC, only the exchanged real power flows back and forth through the shunt unit to the line.

Significantly, the methods and apparatus set forth above are related to power flow control in a single transmission line to which a controller is connected. However, in transmission systems in general, transmission lines are usually connected at common voltage buses. Therefore, any change in power flow in one line will affect the power flow in other lines as well. Thus, the real power burden cannot be directly transferred from one specific line to another.

Turning now to FIG. 9, it is seen that an Interline Power Flow Controller (IPFC) generally has a number of VSCs, where each VSC is connected in series with a particular transmission line through a coupling transformer. Each VSC has a set of DC terminals, and all the VSCs in the IPFC are connected at their common DC terminals. The voltage injected in series with each line by a respective VSC has a direct or real component and a quadrature or reactive component with respect to the prevailing line current. The quadrature component provides capacitive or inductive compensation that increases or decreases the power flow of the specific line. The real component results in an exchange of real power with the specific line. The real power can be transferred from one line to another through a common DC link capacitor (not shown). The IPFC can thus equalize both real and reactive power flow between transmission lines by transferring real power from over-loaded to under-loaded lines. However, and importantly, using the IFPC for this purpose is relatively expensive.

A VSC is capable of injecting a voltage into a transmission line, although it is known that doing so in sub-cycle time is not advisable. In particular, if the series injection transformer of a VSC is not properly rated, a sudden injection of voltage may cause transformer saturation, and system instability may occur. Also, a VSC is not preferred since the output voltage of a VSC always injects harmonic components into the power system network.

As is known, a VSC unit is essentially an AC voltage source behind the leakage reactance of the coupling transformer. Since the coupling transformer and other magnetic circuits offer an inherent leakage reactance, there is a corresponding inductive compensation, whether desired or not, before the VSC even provides any compensation. For example, a converter rated for 1 pu capacitive and 1 pu inductive compensation with a 15% leakage reactance actually provides 0.85 pu capacitive and 1.15 pu inductive compensation to the transmission line. As should be appreciated, then, a VSC is not dependable to be used to limit a fault current.

To limit the fault current to the fullest extent, then, the VSC has to be operational without providing any reactance compensation so that the VSC may be able to emulate the highest possible inductor that its rating permits. In another extreme case, consider the VSC is providing the fullest possible inductive compensation in series with the line before a fault occurs, in which case the VSC is providing a series injection of rated voltage while carrying a rated current. In the event of a fault, the current through the VSC rises and the compensator has to be bypassed; otherwise the converter will be destroyed from the increasing fault current.

A need exists, then, for a method and apparatus for transferring power from an over-loaded transmission line to an under-loaded transmission line in a multi-line transmission system with minimum impact on power flow in other lines in the transmission system. More particularly, a need exists for such a method and apparatus which generates the required compensating voltage of line frequency directly by using reliable, traditional and thus less expensive technology, which does not generate any extra harmonic component.

SUMMARY OF THE INVENTION

In the present invention, the aforementioned need is satisfied by a multi-line power flow transformer that implements power flow control among a plurality of transmission lines in an n-phase power transmission system. Each phase of the power transmission system at a first location has a transmission voltage, and the transmission lines extend from the first location.

The transformer has an exciter unit with n primary windings. Each primary winding is on a core and is for receiving the transmission voltage at the first location of a respective one of the phases of the power transmission system. The transformer also has a series compensating unit for each of the plurality of transmission lines. Each series compensating unit has n secondary windings on the core of each primary winding for a total of n×n secondary windings. Each secondary winding has a voltage induced thereon by the corresponding primary winding. For each phase, the secondary windings of the series compensating unit assigned to the phase are coupled in series for summing the induced voltages formed thereon. The summed voltage is a compensating voltage for the phase.

The compensating voltage has a magnitude and an angle with respect to line current and is series injected into the corresponding line. Each series compensating unit thereby supplies/absorbs an amount of real power $P_{dq}$ into/from the corresponding transmission line and supplies/absorbs an amount of reactive power $Q_{dq}$ into/from the corresponding transmission line.

The transformer also has a controller for controlling the magnitude of the voltage induced on each series compensating unit and for controlling the angle with respect to line current of the voltage induced on each series compensating unit. In one embodiment of the present invention, the controller ensures that the sum of all injected real power from all series compensating units into all corresponding transmission lines $\Sigma P_{dq}$ is zero, and that the sum of all injected reactive power from all series compensating units into all corresponding transmission lines $\Sigma Q_{dq}$ is zero.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

In the present invention, a Mult-line Power Flow Transformer (MPFT) transfers real and reactive power from one or more transmission lines, referred to as "master" lines, to the others, referred to as "slave" lines. The MPFT selectively controls the real and reactive power flow in each line in a multi-line transmission system and provides power flow management for the transmission system by decreasing the power flow in an over-loaded line and increasing the power flow in an under-loaded line. The MPFT generates a number of voltages of line frequency, each of which is injected in series with one transmission line. The generated voltage is at any angle with respect to the prevailing line current of the transmission line and emulates, in series with the line, a capacitor that increases the power flow of the line or an inductor that decreases the power flow of the line and a positive resistor that absorbs real power from the line or a negative resistor that delivers real power to the line. The compensating voltage of each slave transmission line is at an appropriate angle with respect to the prevailing line current so that the real and reactive power from the master transmission line(s) are transferred to the slave transmission line(s).

An MPFT can thus transfer real and reactive power between a number of transmission lines and control real and reactive power flow in each line selectively. The compensating voltage that is injected in series with a transmission line is of fundamental frequency without any harmonic component.

Figure 10:
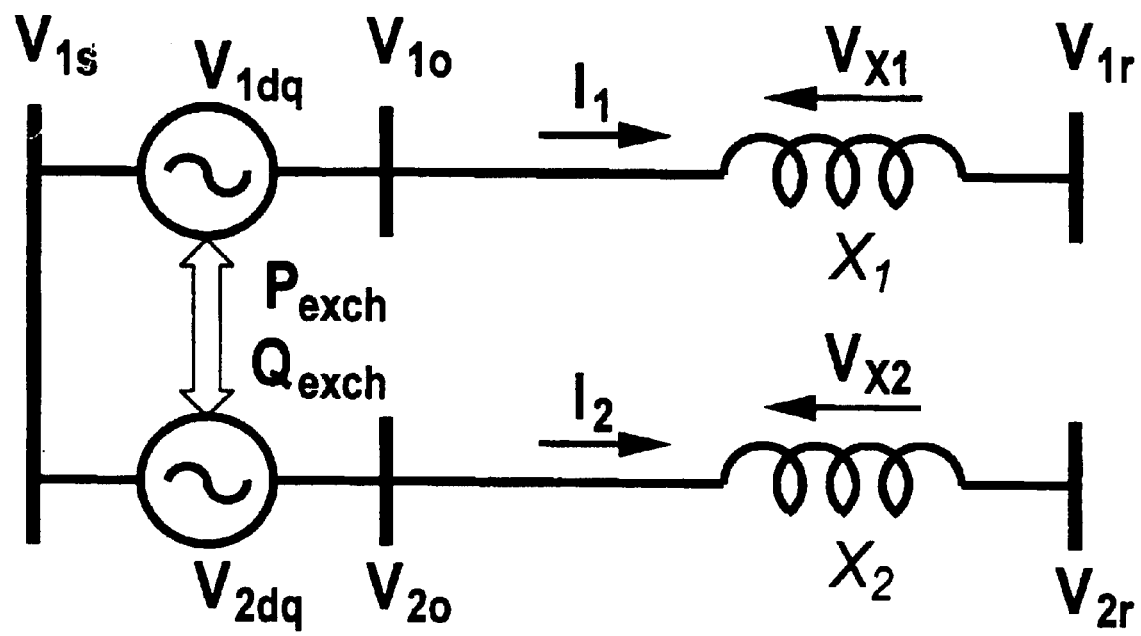
FIG. 10 is a schematic diagram showing power transmission control by a two-line Multi-Line Power Flow Transformer (MPFT) in accordance with one embodiment of the present invention.

One relatively simple embodiment of the present invention is shown in FIG. 10, and interconnects two transmission lines. Both lines are connected together at a sending end with voltage $V_{1s}$. Lines 1 and 2 each have a series compensating voltage, $V_{1dq}$, $V_{2dq}$, a line reactance $X_1$, $X_2$, and a receiving end voltage $V_{1r}$, $V_{2r}$, respectively. The effective sending end voltages $V_{1o}$, $V_{2o}$, for lines 1 and 2 are thus:

$$V_{1o}=V_{1s}+V_{1dq}, \text{ and}$$

$$V_{2o}=V_{2s}+V_{2dq}.$$

The compensating voltage $V_{1dq}$ delivers real and reactive power $P_{1dq}$, $Q_{1dq}$, respectively, to line 1. Likewise, the compensating voltage $V_{2dq}$ delivers real and reactive power $P_{2dq}$, $Q_{2dq}$, respectively, to line 2.

Figure 11:
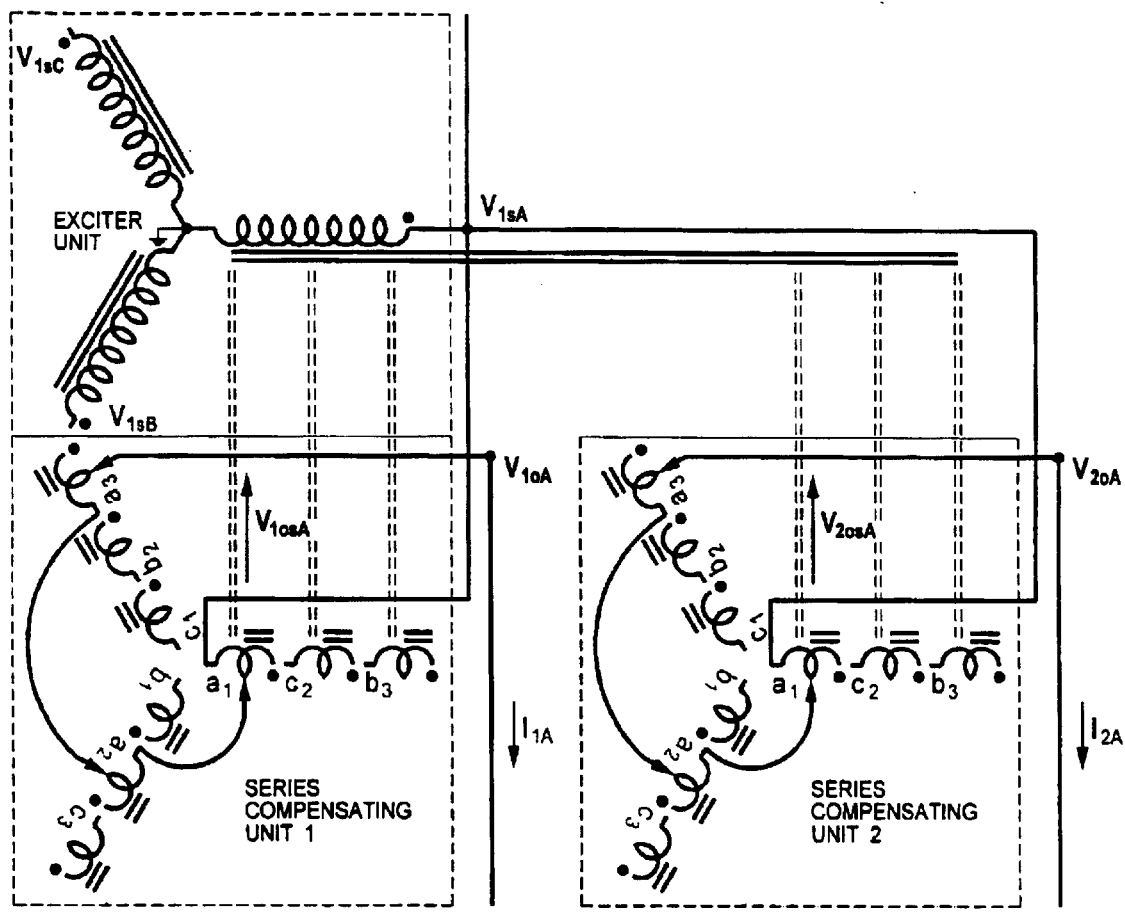
FIG. 11 is a schematic diagram showing an implementation of the two compensating voltage sources of FIG. 10 in an elementary MPFT in accordance with one embodiment of the present invention.

The implementation of the two compensating voltage sources in an elementary MPFT is shown in FIG. 11 where $V_{1dq}$ and $V_{2dq}$ are termed as $V_{1os}$ and $V_{2os}$, respectively. In a preferred embodiment of the MPFT, and as shown in FIG. 11, such MPFT has an exciter unit that acts as a primary and a plurality of series compensating units that each act as a secondary, where each series compensating unit is for and is coupled to a respective one of the lines interconnected in the transmission system. Since the system of FIG. 10 has two interconnected transmission lines 1, 2, two series compensating units 1, 2, are provided in the MPFT of FIG. 11.

Figure 1:
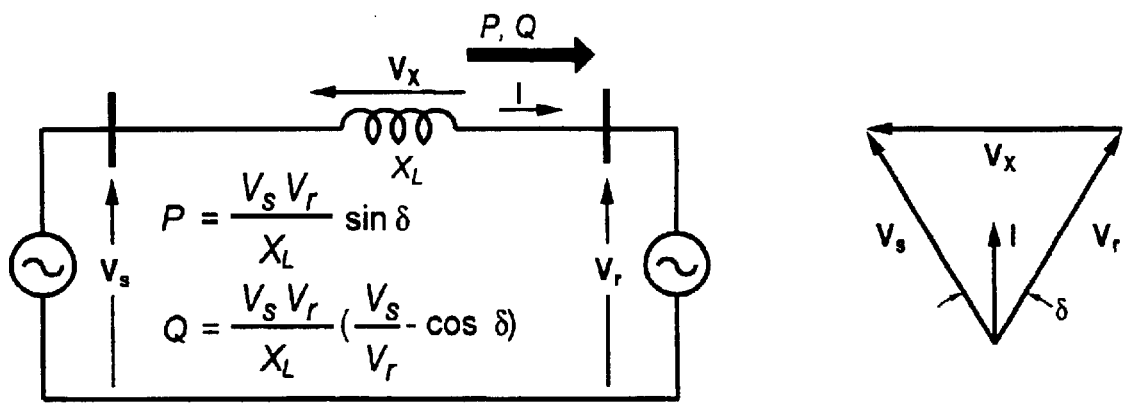
FIG. 1 Is a schematic diagram showing an elementary power transmission system.
Figure 2:
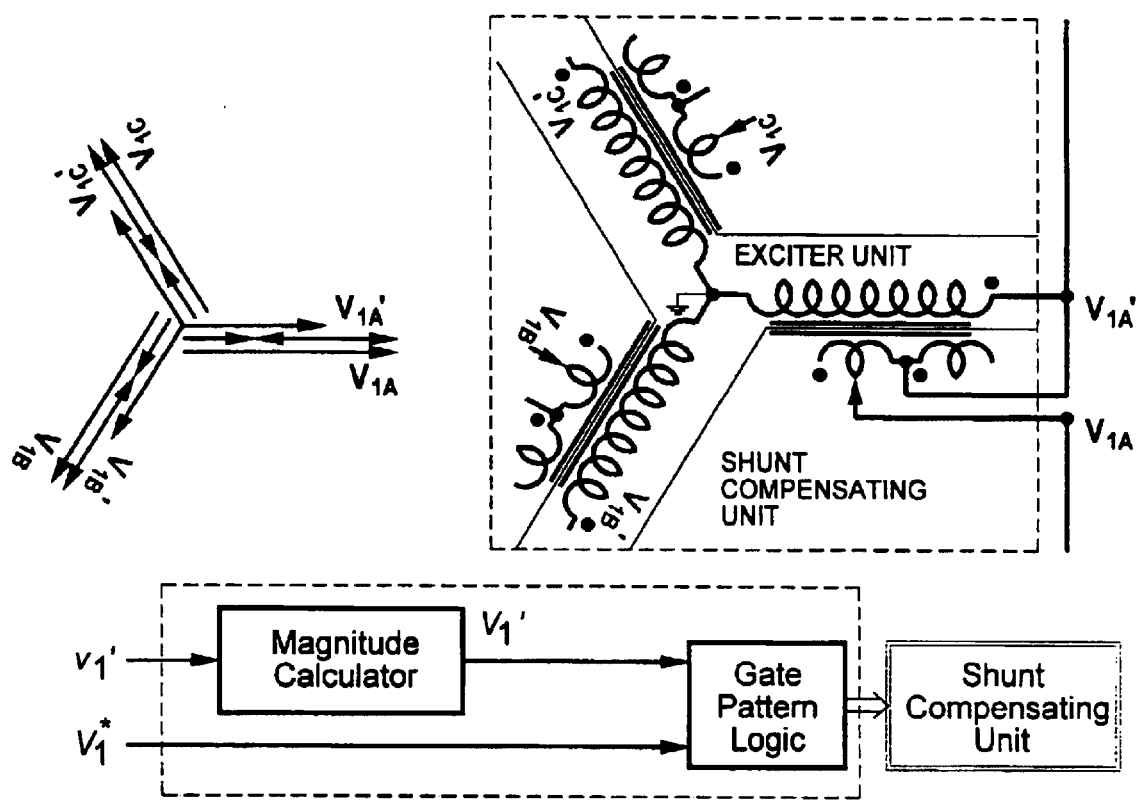
FIG. 2 is a schematic diagram showing a shunt compensating transformer and its control that may be employed In connection with the power transmission system of FIG. 1.
Figure 3:
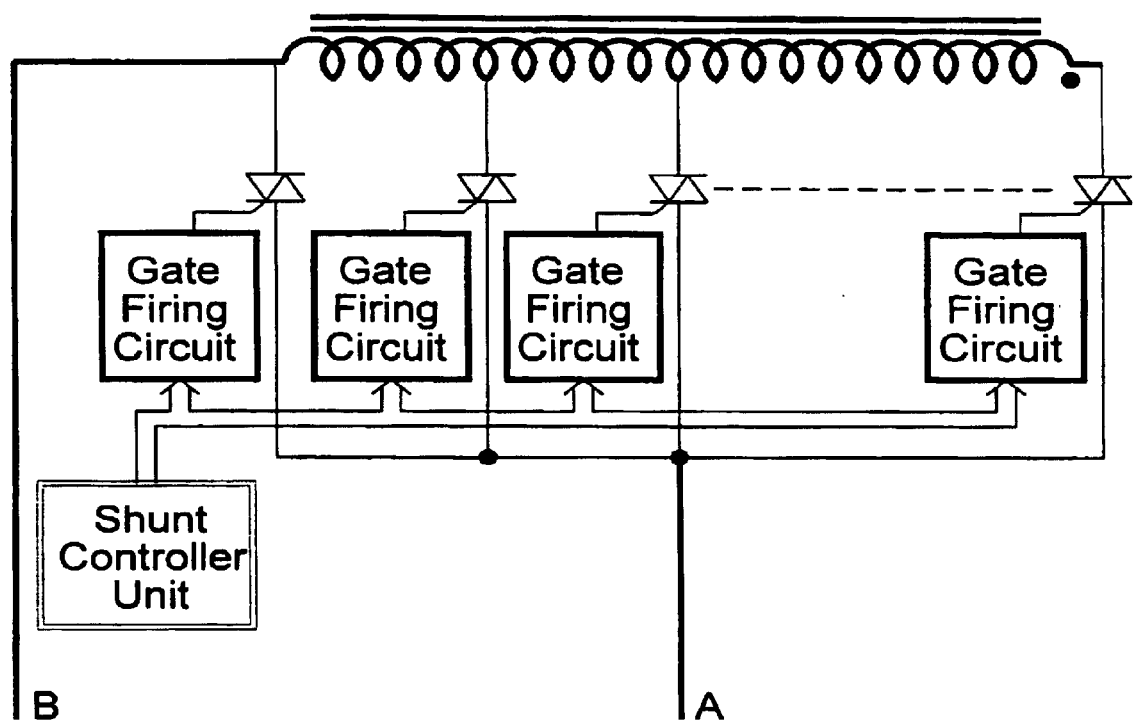
FIG. 3 is a schematic diagram showing a thyristor-controlled tap changer that may be employed to control the transformer of FIG. 2.
Figure 4A:
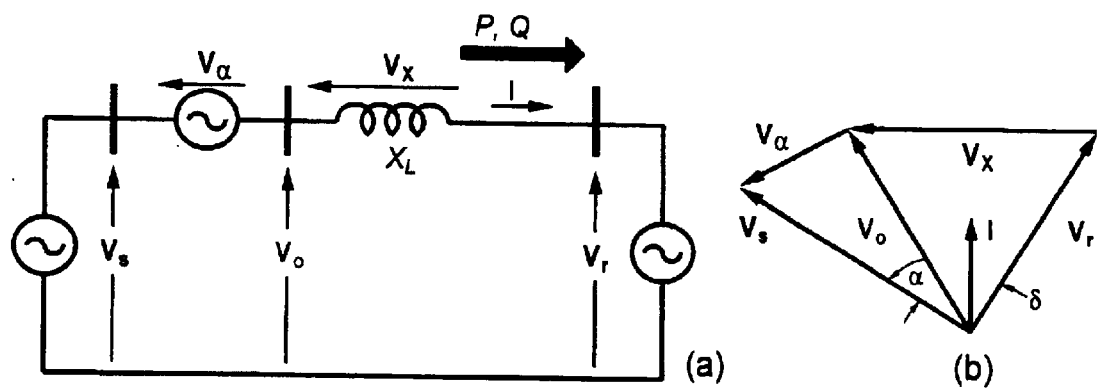
FIG. 4A is a schematic diagram showing power transmission control by phase angle regulator in connection with the power transmission system of FIG. 1.
Figure 4B:
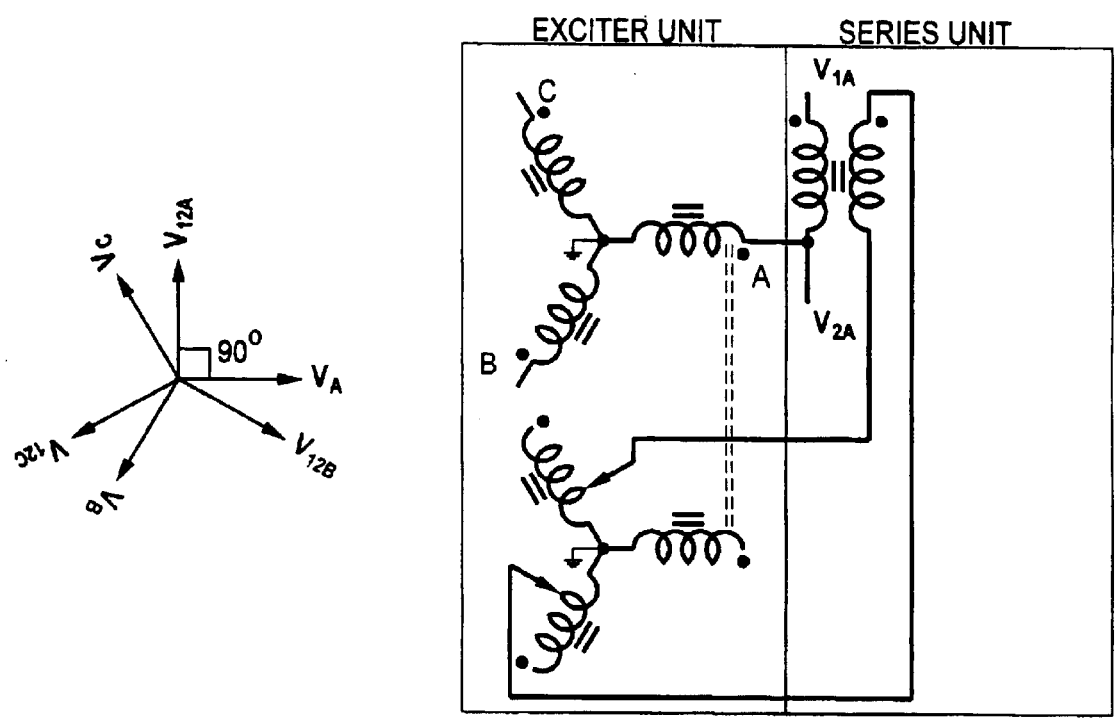
FIG. 4B is a schematic diagram showing the phase angle regulator scheme of FIG. 4A with two transformers.
Figure 5:
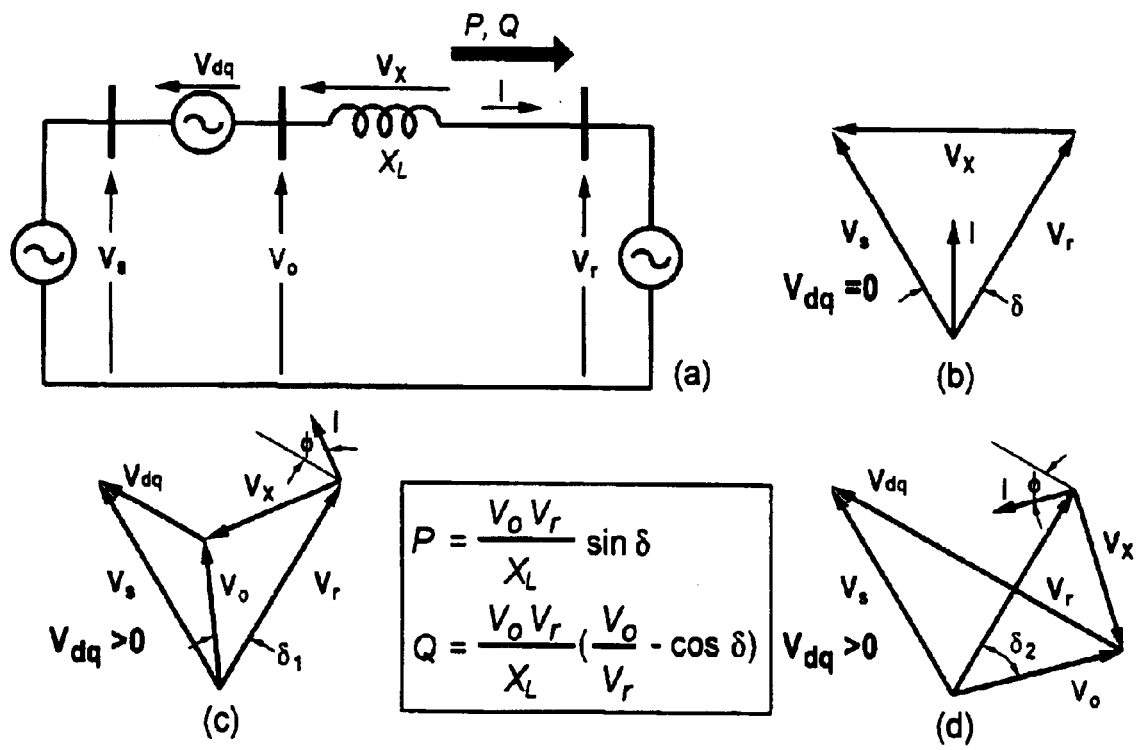
FIG. 5 is a schematic diagram showing the operation of an ideal power flow controller and related phasor diagrams.

As seen in the MPFT of FIG. 11, the line voltage $V_{1s}$, is applied across the primary windings 1A, 1B, 1C of a three-phase transformer in the exciter unit. For each series compensating unit 1, 2, each primary winding 1A, 1B, 1C has three secondary windings in series, for a total of nine secondary windings—a1, c2 and b3 on the core of A-phase; b1, a2 and c3 on the core of B-phase; and c1, b2 and a3 on the core of C-phase, and for a grand total of eighteen secondary windings when both series compensating units 1, 2 are considered together. As seen, for each compensating unit 1, 2, a compensating voltage for any phase is derived from the vectorial sum of the voltages induced in a three-phase winding set—a1, a2 and a3 for injection in A-phase; b1, b2 and b3 for injection in B-phase; and c1, c2 and c3 for injection in C-phase. Importantly, for each series compensating unit 1, 2, a tap is employed on each of the nine secondary windings so that each entity in each vectorial sum can be individually magnitudally varied. Each tap may be a mechanical or solid-state tap changer such as the tap changer of FIG. 3, e.g., although other types of taps may be employed.

For example, and more specifically, for series compensating unit 1, the voltage $V_{1osA}$ (shown) is the sum of at least a tapped portion (0 to 100 percent) of the voltage across a1 as derived from A-phase, at least a tapped portion (0 to 100 percent) of the voltage across a2 as derived from B-phase, and at least a tapped portion (0 to 100 percent) of the voltage across a3 as derived from C-phase:

$$V_{1osA}=\% \ x \ a1+\% \ y \ a2+\% \ z \ a3;$$

and voltage $V_{1osA}$ is injected as a compensating voltage in line with $V_{1sA}$ to produce compensated voltage $v_{1oA}$:

$$V_{1oA}=V_{1osA}+V_{1sA}.$$

Compensating voltages $V_{1osB}$ for the B-phase of series compensating unit 1 and $V_{1osC}$ for the C-phase of series compensating unit 1 are similarly produced:

$$V_{1osB}=\% \ x \ b1+\% \ y \ b2+\% \ z \ b3;$$

$$V_{1oB}=V_{1osB}+V_{1sB}.$$

$$V_{1osC}=\% \ x \ c1+\% \ y \ c2+\% \ z \ c3;$$

$$V_{1oC}=V_{1osC}+V_{1sC}.$$

Similarly, compensating voltages $V_{2osA}$ for the A-phase of series compensating unit 2, $V_{2osB}$ for the B-phase of series compensating unit 2, and $V_{2osC}$ for the C-phase of series compensating unit 2 are also produced:

$$V_{2osA}=\% \ x \ a1+\% \ y \ a2+\% \ z \ a3;$$

$$V_{2oA}=V_{2osA}+V_{2sA}.$$

$$V_{2osB}=\% \ x \ b1+\% \ y \ b2+\% \ z \ b3;$$

$$V_{2oB}=V_{2osB}+V_{2sB}.$$

$$V_{2osC}=\% \ x \ c1+\% \ y \ c2+\% \ z \ c3;$$

$$V_{2oC}=V_{2osC}+V_{2sC}.$$

Figure 6:
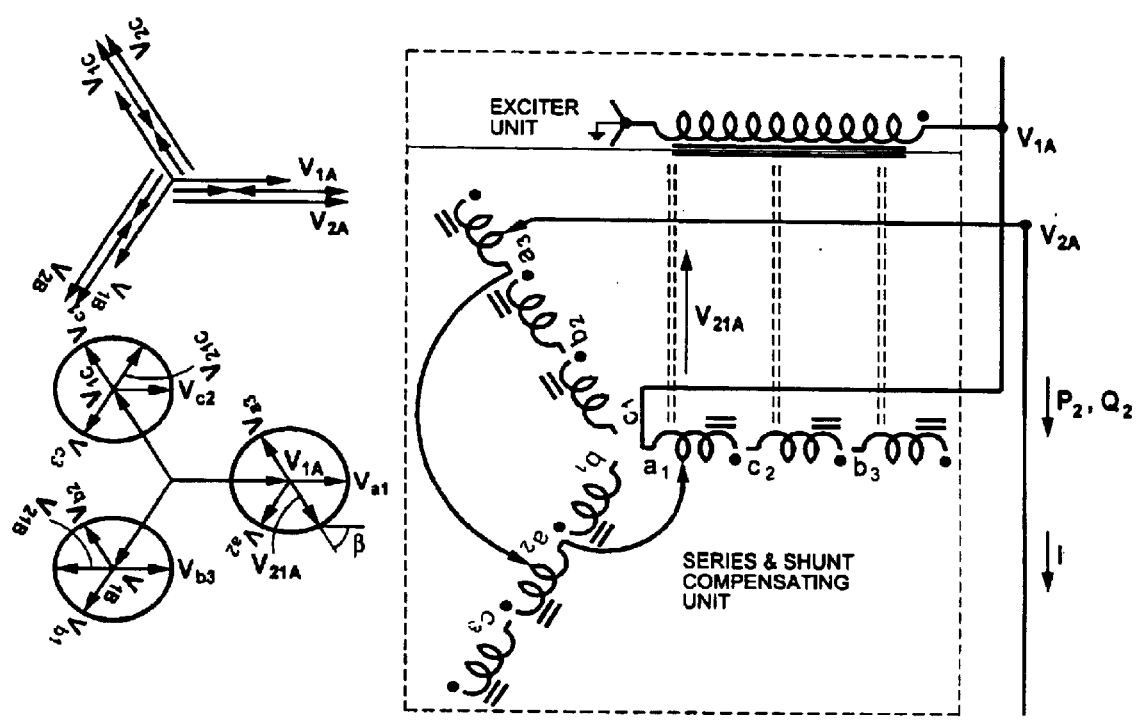
FIG. 6 is a schematic diagram showing power transmission control by a versatile power flow transformer (VPFT) in connection with the power transmission system of FIG. 1.

As with the VPFT of FIG. 6, for each series compensating unit 1, 2, a1, b1, and c1 should be substantially identical; a2, b2, and c2 should be substantially identical; and a3, b3, and c3 should be substantially identical. In addition, for each series compensating unit 1, 2, each of % x, % y, and % z should be substantially identical across the phases of such series compensating unit 1, 2. Accordingly, the magnitude of the produced $V\_{osA}$, $V\_{osB}$, and $V\_{osC}$ should be substantially identical; and $V\_{osA}$, $V\_{osB}$, and $V\_{osC}$ should be substantially 120 degrees out of phase with each other, assuming that $V_{1sA}$, $V_{1sB}$, and $V_{1sC}$ are substantially 120 degrees out of phase with each other. Accordingly, the individual transmission lines A, B, and C of the corresponding line as compensated are substantially in balance.

As should now be appreciated, for each series compensating unit 1, 2, by choosing the number of turns of each of the three windings, and therefore the magnitudes of the components of the three induced voltages, the composite series injected voltage's magnitude and angle with respect to the transmission line voltage can be selected. The compensating voltage $V_{1os}$ in the series compensating unit 1 can be at any angle with the prevailing line current, $I_1$, which emulates, in series with line 1, a capacitor that increases the power flow of the line or an inductor that decreases the power flow of the line and a positive resistor that absorbs real power from the line or a negative resistor that delivers real power to the line. Likewise, the compensating voltage $V_{2os}$ in the series compensating unit 2 can be at any angle with the prevailing line current, $I_2$, which emulates, in series with line 2, a capacitor that increases the power flow of the line or an inductor that decreases the power flow of the line and a positive resistor that absorbs real power from the line or a negative resistor that delivers real power to the line.

Figure 7:
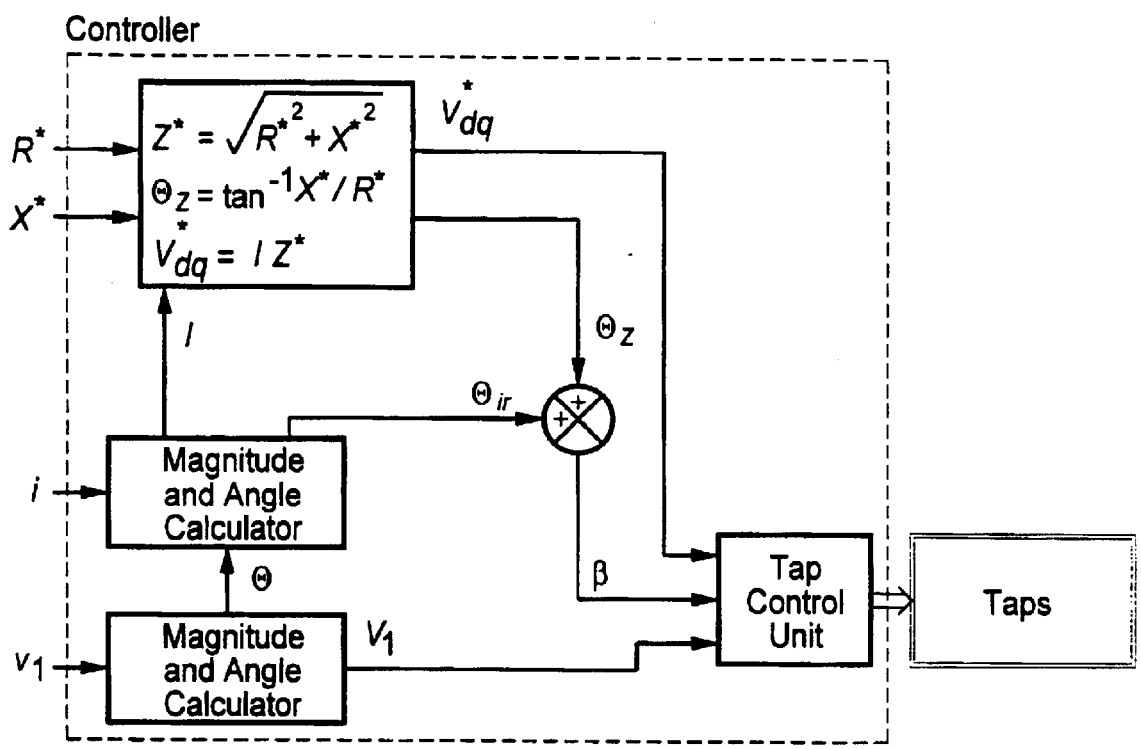
FIG. 7 is a schematic diagram showing a control block diagram for impedance emulation for use in connection with the VPFT of FIG. 6.
Figure 8:
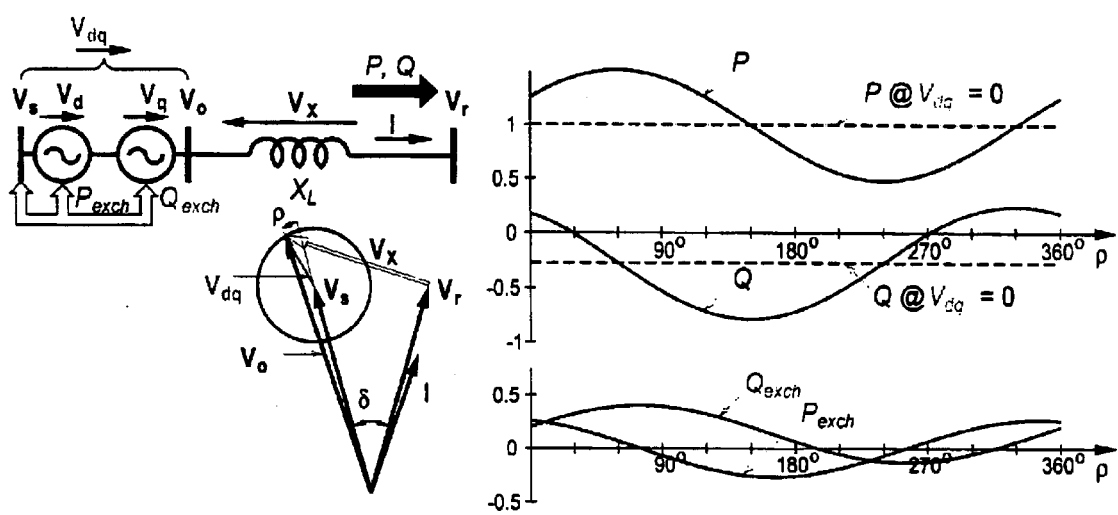
FIG. 8 is a schematic diagram showing a basic versatile power flow transformer model in connection with the VPFT of FIG. 6.

The controller shown in FIG. 7 for controlling the series impedance emulation achieved by the VPFT of FIG. 6 may also be employed to control the series compensating units 1, 2, of the MPFT of FIGS. 10 and 11, and specifically the taps thereof. Note, though, that the input parameters $i_1$ or $i_2$ and $v_{1s}$ are substituted for i and $v_1$. Note too that the desired compensating voltage $V_{1os}$ or $V_{2os}$ (i.e., $V_{dq}^*$ in FIG. 7) is derived by the controller in terms of emulated resistance and reactance ($R^*$ and $X^*$) inputs.

For each series compensating unit 1, 2, and again, the controller performs the following steps. An instantaneous 3-phase set of line voltages, $v_{1s}$, (i.e., $v_{1sA}$, $v_{1sB}$, $v_{1sC}$) is used to calculate the reference angle, $\Theta$, which is phase-locked to the phase a of the line voltage, $v_{1sA}$. From an instantaneous 3-phase set of measured line currents ($I_1$ for the series compensating unit 1 for line 1, $i_2$ for the series compensating unit 2 for line 2), the magnitude i, and its relative angle $\Theta_{ir}$, with respect to the phase-lock-loop angle $\Theta$, are calculated. From the compensating resistance demand, $R^*$, and the compensating reactance demand, $X^*$ as determined from the desired compensating voltage $V_{1os}$ or $V_{2os}$, the demanded impedance's magnitude $Z^*$, and angle $\Theta_z$, are calculated. The magnitude I of the line current multiplied by the compensating impedance demand $Z^*$ is the insertion voltage magnitude demand $V_{dq}^*$ (i.e., $V_{1os}$ or $V_{2os}$ in FIG. 11). The relative phase angle $\beta$ of this insertion voltage demand is $\Theta_{ir}+\Theta_z$.

Once the desired series injection voltage $V_{dq}^*$ and its angle, $\beta$, are defined for a particular series compensating unit 1, 2, the Tap Control Unit of FIG. 7 determines the contribution from each winding of the series compensating unit 1, 2 (a1, a2, and a3 for injection in A-phase; b1, b2, and b3 for injection in B-phase; and c1, c2, and c3 for injection in C-phase) to constitute such defined $V_{dq}^*$ and $\beta$. In particular, from knowledge of the magnitude of the exciter voltage, $V_{1s}$, the Tap Control Unit determines the number of turns necessary on each winding of the series compensating unit 1, 2. Based on this calculation, the appropriate taps are switched on via an appropriate mechanical or solid state tap changer (see FIG. 3, e.g.), which accordingly put the required number of turns in series with the line. In addition, an MPFT can regulate the line voltage by utilizing the unused portions of the transformer windings as a shunt compensating unit.

In one embodiment of the present invention, the taps are set first for the series compensating unit 1 of line 1, and then the compensating voltage $V_{2dq}$ in the series compensating unit 2 of line 2 (i.e., $V_{2os}$) is set at a specific magnitude and angle with respect to the prevailing line current $I_2$ based on the criterion that for proper power transfer from one line to the other, the following condition should be maintained:

$$P_{exch}=P_{1dq}=-P_{2dq}, \text{ and}$$

$$Q_{exch}=Q_{1dq}=-Q_{2dq}, \text{ and}$$

That is, real power removed from or added to line 1 should be added to or removed from line 2, respectively, and reactive power removed from or added to line 1 should likewise be added to or removed from line 2, respectively.

Thus, for a certain compensating voltage $V_{1dq}$ in line 1, the exchanged real power $P_{1dq}$ and reactive power $Q_{1dq}$ are calculated:

$$P_{1dq}=V_{1dq}^* \cdot I_1, \text{ and}$$

$$Q_{1dq}=V_{1dq} \times I_1.$$

For line 2, the emulated resistance and reactance for inputting to the controller of FIG. 7 ($R^*$ and $X^*$) are then calculated as:

$$R^*=-P_{1dq}/I_2^2, \text{ and}$$

$$X^*=-Q_{1dq}/I_2^2.$$

The two calculated input parameters R* and X* and $I_2$ (substituted for I) are then provided to the controller of FIG. 7 to set the taps for the compensating windings for the series compensating unit 2 of line 2.

Significantly, although the present invention has been described in terms of two lines 1, 2 and two corresponding series compensating units 1, 2 in the MPFT, such invention may also be implemented in terms of any number N of lines and any corresponding number N of series compensating units in the MPFT, provided that a net zero sum of real power transferred is achieved and a corresponding net zero sum of reactive power transferred is achieved. That is:

$$P_{1dq}+P_{2dq}++P_{Ndq}=0, \text{ and}$$

$$Q_{1dq}+Q_{2dq}++Q_{Ndq}=0.$$

Accordingly, proper power transfer is achieved. Note that transfers of power between the transmission lines flow through the exciter unit of the MPFT. Thus, such exciter unit must be rated to carry the transferred power between such lines.

The above examples of power transfer between two and more than two transmission lines include an assumption that a net zero sum of real power is transferred among the lines and a corresponding net zero sum of reactive power is transferred among the lines. However, a net zero sum of power transfer is not an absolute requirement. Instead, and importantly, a non-net zero sum of power transfer may also be performed without departing from the spirit and scope of the present invention. As may be appreciated, in the case of a non-net zero sum power transfer, excess power from the transfer is shunted back to the source by way of the exciter unit of the MPFT or additional power for the transfer is drawn from the source by way of the exciter unit of the MPFT.

The hardware necessary to effectuate the present invention, such as the transformers and tap changers, is known or should be readily apparent to the relevant public. Accordingly, further details as to the specifics of such hardware are not believed to be necessary herein. The programming necessary to effectuate the present invention, such as the programming run by the controller of FIG. 7, should be readily apparent to the relevant public. Accordingly, further details as to the specifics of such programming are also not believed to be necessary herein.

Figure 9:
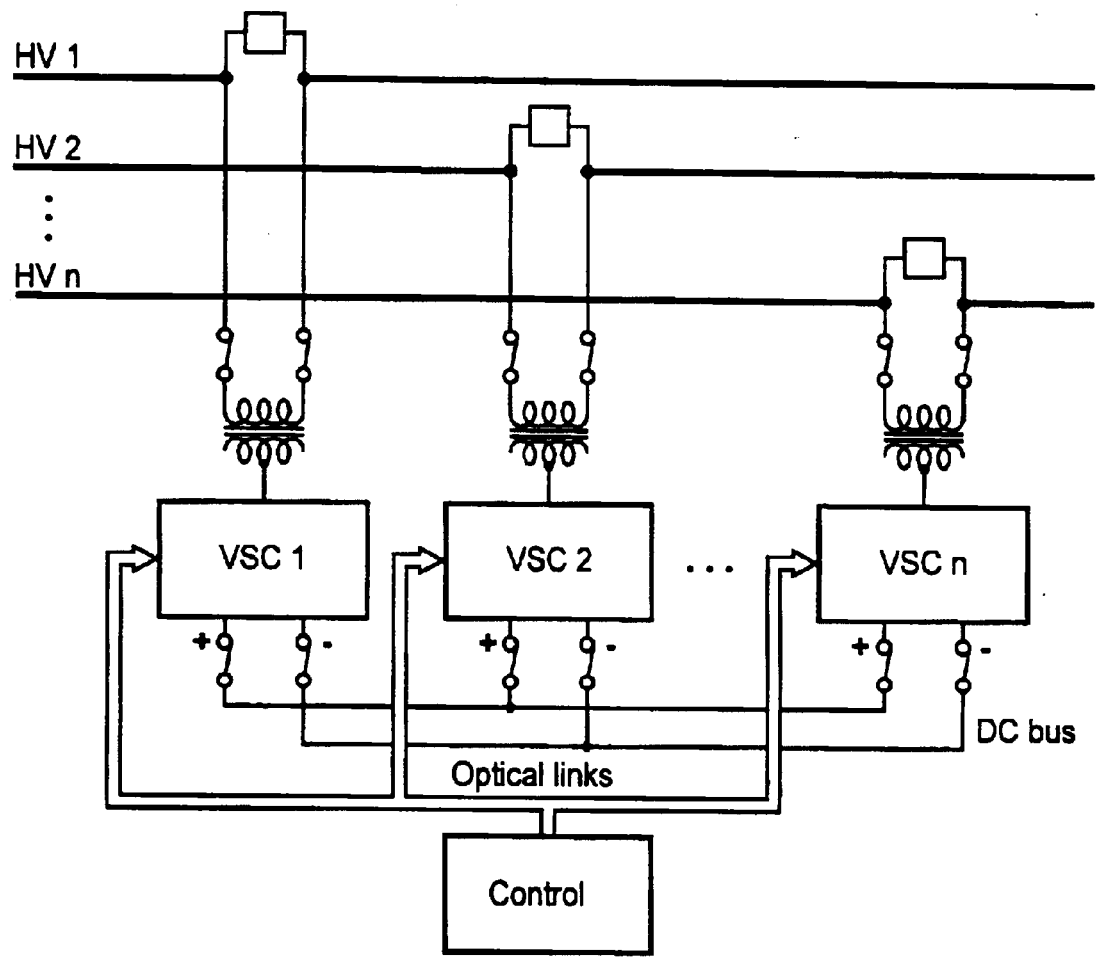
FIG. 9 is a schematic diagram showing power transmission control by an Inter-line Power Flow Controller (IPFC) having N Voltage Source Converters (VSCs) in connection with the power transmission system of FIG. 1.

The Multi-line Power Flow Transformer (MPFT) of the present invention as shown in FIGS. 10 and 11 is based on the traditional technologies of transformers and tap changers. Notably, because the IPFC of FIG. 9 includes delicate power electronics and accessories, the MPFT has an approximate cost of about 20% of a correspondingly rated IPFC.

As should now be understood, in the present invention, a Multi-line Power Flow Transformer (MPFT) is employed to selectively control the real and the reactive power flow as between transmission lines in a transmission system and also regulate the voltage of each transmission line. In addition, such MPFT may be employed to selectively transfer power between transmission lines. Such MPFT generates for each transmission line a compensating voltage of line frequency for series injection with the line. Such compensating voltage is extracted from a bus voltage and is of variable magnitude and at any angle with respect to the line voltage. The compensating voltage is also at any angle with respect to the prevailing line current, which emulates, in series with the line, a capacitor that increases the power flow of the line or an inductor that decreases the power flow of the line and a positive resistor that absorbs real power from the line or a negative resistor that delivers real power to the line. Significantly, in the present invention, the real and the reactive power flow in each line can be regulated selectively such that real and reactive power are selectively transferred between the lines in a net zero sum manner.

Although the present invention has been disclosed in terms of a specific embodiment, it will be appreciated by those who are skilled in this art that various modifications and alternatives to this embodiment can be developed in light of the overall teachings of the disclosure. Accordingly, the particular arrangement disclosed here is meant to be illustrative only, and changes could be made to the embodiments described above without departing from the broad inventive concepts thereof. For example, although the present invention is disclosed in terms of a three-phase transmission system, it is to be appreciated that the invention also encompasses use in connection with a transmission system having two, four, five, six, etc. phases. It is understood, therefore, that this invention is not limited to the particular embodiments disclosed, but it is intended to cover modifications within the spirit and scope of the present invention as defined by the appended claims.

What is claimed is:

1. A multi-line power flow transformer for implementing power flow control among a plurality of transmission lines in an n-phase power transmission system, each phase of the power transmission system at a first location having a transmission voltage, the transmission lines extending from the first location, the transformer comprising:

an exciter unit having n primary windings, each primary winding on a core, each primary winding for receiving the transmission voltage at the first location of a respective one of the phases of the power transmission system; and a series compensating unit for each of the plurality of transmission lines, each series compensating unit having n secondary windings on the core of each primary winding for a total of n×n secondary windings, each secondary winding for having a voltage induced thereon by the corresponding primary winding, for each phase, the secondary windings of the series compensating unit assigned to the phase being coupled in series for summing the induced voltages formed thereon, wherein the summed voltage is a compensating voltage for the phase.

2. The transformer of claim 1 wherein in each series compensating unit, for each phase, the in-series secondary windings are further coupled in series with the primary winding corresponding to the phase, wherein the compensating voltage is added to the transmission voltage at the first location of the phase to result in a compensated voltage for the phase.

3. The transformer of claim 1 for implementing power flow control in a transmission line of a 3-phase (A, B, C) power transmission system, the transformer comprising:

in the exciter unit, 3 primary windings;

in each series compensating unit, 3 secondary windings on the core of each primary winding for a total of 9 secondary windings:

secondary windings a1, c2 and b3 on the core of the primary winding associated with A-phase;

secondary windings b1, a2 and c3 on the core of the primary winding associated with B-phase; and secondary windings c1, b2 and a3 on the core of the primary winding associated with C-phase;

a1, a2 and a3 being coupled in series for summing the induced voltages formed thereon, such summed voltage for compensating the voltage on A-phase;

b1, b2 and b3 being coupled in series for summing the induced voltages formed thereon, such summed voltage for compensating the voltage on B-phase; and c1, c2 and c3 being coupled in series for summing the induced voltages formed thereon, such summed voltage for compensating the voltage on C-phase.

4. The transformer of claim 3 further comprising in each series compensating unit an adjustable tap changer coupled to each secondary winding, each tap changer for individually magnitudally varying the induced voltage formed on the corresponding secondary winding, wherein the compensating voltage $V_{21A}$ for A-phase, the compensating voltage $V_{21B}$ for B-phase, and the compensating voltage $V_{21C}$ for C-phase are:

$$V_{21A} = \% \ x \ a1 + \% \ y \ a2 + \% \ z \ a3;$$

$$V_{21B} = \% \ x \ b1 + \% \ y \ b2 + \% \ z \ b3; \text{ and}$$

$$V_{21C} = \% \ x \ c1 + \% \ y \ c2 + \% \ z \ c3;$$

% x, % y, and % z each being set according to the tap changers winding, and wherein, for each phase, the summed voltage is angularly adjustable by adjusting the tap changers of the phase.

5. The transformer of claim 4 wherein % x, % y, and % z are each set between 0 and 1 according to the tap changers.

6. The transformer of claim 4 wherein % x, % y, and % z are each set between −0.5 and 0.5 according to the tap changers.

7. The transformer of claim 3 wherein a1, b1, and c1 are substantially identical; a2, b2, and c2 are substantially identical; and a3, b3, and c3 are substantially identical.

8. The transformer of claim 1 further comprising an adjustable tap changer coupled to each secondary winding, each tap changer for individually magnitudally varying the induced voltage formed on the corresponding secondary winding, wherein, in each series compensating unit, for each phase, the secondary windings assigned to the phase as magnitudally varied by the respective tap changers are coupled in series for summing the magnitudally varied induced voltages formed thereon, and wherein, for each phase, the summed voltage is angularly adjustable by adjusting the tap changers of the phase.

9. The transformer of claim 8 wherein in each compensating unit the compensating voltage is adjustable to any angle with respect to prevailing line current, the transformer thereby being capable of emulating in series with the transmission line an inductor, a capacitor, a positive resistor that absorbs real power from the line and/or a negative resistor that delivers real power to the line.

10. The transformer of claim 8 wherein each tap changer is selected from a group consisting of a mechanical tap changer or a solid-state tap changer.

11. The transformer of claim 8 further comprising a controller for controlling the tap changers, the controller receiving as inputs the transmission voltage of each phase of the power transmission system, a set of measured line currents, a compensating resistance demand, R*, and a compensating reactance demand, X*.

12. The transformer of claim 11 wherein the controller has:

a first magnitude/angle calculator for calculating a magnitude, $v_1$, and a reference angle, Θ, of the transmission line from the transmission voltage of each phase of the power transmission system;

a second magnitude/angle calculator for calculating a magnitude, I, and a relative angle, Θir, with respect to Θ of the line current based on the set of measured line currents;

a demanded impedance calculator for calculating a magnitude, Z*, and angle, $\Theta_z$, of a demanded impedance based on the compensating resistance demand, R*, and the compensating reactance demand, X*;

an insertion voltage magnitude demand calculator for calculating an insertion voltage magnitude demand, $V_{dq}^*$, based on the magnitude, I, of the line current as multiplied by the demanded impedance magnitude, Z*;

a relative phase angle demand calculator for calculating a relative phase angle demand, β, based on the sum of $\Theta_{ir}$ and $\Theta_z$; and a tap control unit for adjusting the tap changers based on $V_{dq}^*$, β, and $V_1$.

13. The transformer of claim 1 wherein in each series compensating unit, the compensating voltage supplies and absorbs both real and reactive power.

14. A multi-line power flow transformer for implementing power flow control among a plurality of transmission lines in an n-phase power transmission system, each phase of the power transmission system at a first location having a transmission voltage, the transmission lines extending from the first location, the transformer comprising:

an exciter unit for receiving the transmission voltage at the first location of the power transmission system;

a series compensating unit for each of the plurality of transmission lines, each series compensating unit for having a voltage induced thereon by the exciter unit, wherein the induced voltage has a magnitude and an angle with respect to line current and is a compensating voltage series injected into the corresponding line, each series compensating unit thereby supplying/absorbing an amount of real power $P_{dq}$ into/from the corresponding transmission line and supplying/absorbing an amount of reactive power $Q_{dq}$ into/from the corresponding transmission line; and a controller for controlling the magnitude of the voltage induced on each series compensating unit, for controlling the angle with respect to line current of the voltage induced on each series compensating unit, for ensuring that the sum of all injected real power from all series compensating units into all corresponding transmission lines $\Sigma P_{dq}$ is zero, and for ensuring that the sum of all injected reactive power from all series compensating units into all corresponding transmission lines $\Sigma Q_{dq}$ is zero.

15. The transformer of claim 14 comprising:

an exciter unit having n primary windings, each primary winding on a core, each primary winding for receiving the transmission voltage at the first location of a respective one of the phases of the power transmission system; and a series compensating unit for each of the plurality of transmission lines, each series compensating unit having n secondary windings on the core of each primary winding for a total of n×n secondary windings, each secondary winding for having a voltage induced thereon by the corresponding primary winding, for each phase, the secondary windings of the series compensating unit assigned to the phase being coupled in series for summing the induced voltages formed thereon, wherein the summed voltage is a compensating voltage for the phase.

16. The transformer of claim 15 wherein in each series compensating unit, for each phase, the in-series secondary windings are further coupled in series with the primary winding corresponding to the phase, wherein the compensating voltage is added to the transmission voltage at the first location of the phase to result in a compensated voltage for the phase.

17. The transformer of claim 15 further comprising an adjustable tap changer coupled to each secondary winding, each tap changer for individually magnitudally varying the induced voltage formed on the corresponding secondary winding, wherein, in each series compensating unit, for each phase, the secondary windings assigned to the phase as magnitudally varied by the respective tap changers are coupled in series for summing the magnitudally varied induced voltages formed thereon, and wherein, for each phase, the summed voltage is angularly adjustable by adjusting the tap changers of the phase.

18. The transformer of claim 17 further comprising a controller for controlling the tap changers, the controller receiving as inputs the transmission voltage of each phase of the power transmission system, a set of measured line currents, a compensating resistance demand, $R^*$, and a compensating reactance demand, $X^*$.

19. The transformer of claim 18 wherein with regard to any series compensating unit and the corresponding transmission line the controller has:
   a first magnitude/angle calculator for calculating a magnitude, $v_1$, and a reference angle, $\Theta$, of the transmission line from the transmission voltage of each phase of the power transmission system;
   a second magnitude/angle calculator for calculating a magnitude, I, and a relative angle, $\Theta_{ir}$, with respect to $\Theta$ of the line current based on the set of measured line currents;
   a demanded impedance calculator for calculating a magnitude, $Z^*$, and angle, $\Theta_z$, of a demanded impedance based on the compensating resistance demand, $R^*$, and the compensating reactance demand. $X^*$;
   an insertion voltage magnitude demand calculator for calculating an insertion voltage magnitude demand, $V_{dq}^*$, based on the magnitude, I, of the line current as multiplied by the demanded impedance magnitude, $Z^*$;
   a relative phase angle demand calculator for calculating a relative phase angle demand, $\beta$, based on the sum of $\Theta_{ir}$, and $\Theta_z$; and
   a tap control unit for adjusting the tap changers based on $V_{dq}^*$, $\beta$, and $V_1$.

20. The transformer of claim 14 having first and second series compensating units for first and second transmission lines, respectively, the first series compensating unit injecting an amount of real power $P_{1dq}$ into the first transmission line and injecting an amount of reactive power $Q_{1dq}$ into the first transmission line and the second series compensating unit injecting an amount of real power $P_{2dq}$ into the second transmission line and injecting an amount of reactive power $Q_{2dq}$ into the second transmission line, wherein the controller ensures that $P_{1dq}=-P_{2dq}$ and that $Q_{1dq}=-Q_{2dq}$.

21. The transformer of claim 20 wherein the controller:
   detects a line current $I_1$ of the first transmission line;
   detects a line current $I_2$ of the second transmission line;
   determines a compensating voltage $V_{1dq}$ for being series injected by the first series compensating unit into the first transmission line;
   calculates for the first transmission line the exchanged real power $P_{1dq}$ and reactive power $Q_{1dq}$:

$P_{1dq}=V_{1dq}^* \cdot I_1$, and $Q_{1dq}=V_{1dq} \times I_1$;

calculates for the second transmission line a resistance $R^*$ and reactance $X^*$ to be emulated by the second series compensating:

$R^*=-P_{1dq}/I_2^2$, and $X^*=-Q_{1dq}/I_2^2$; and determines a compensating voltage $V_{2dq}$ for being series injected by the second series compensating unit into the second first transmission based on the calculated resistance $R^*$ and reactance $X^*$ and the detected line current $I_2$.

22. A method in combination with a multi-line power flow transformer for implementing power flow control among a plurality of transmission lines in an n-phase power transmission system, each phase of the power transmission system at a first location having a transmission voltage, the transmission lines extending from the first location, the transformer comprising:
   an exciter unit for receiving the transmission voltage at the first location of the power transmission system;
   first and second series compensating units for first and second transmission lines, respectively, each series compensating unit for having a voltage induced thereon by the exciter unit, wherein the induced voltage has a magnitude and an angle with respect to line current and is a compensating voltage series injected into the corresponding line, the first series compensating unit injecting an amount of real power $P_{1dq}$ into the first transmission line and injecting an amount of reactive power $Q_{1dq}$ into the first transmission line and the second series compensating unit injecting an amount of real power $P_{2dq}$ into the second transmission line and injecting an amount of reactive power $Q_{2dq}$ into the second transmission line; and
   a controller for controlling the magnitude of the voltage induced on each series compensating unit and for controlling the angle with respect to line current of the voltage induced on each series compensating unit,
   the method comprising:
   detecting a line current $I_1$ of the first transmission line;
   detecting a line current $I_2$ of the second transmission line;
   determining a compensating voltage $V_{1dq}$ for being series injected by the first series compensating unit into the first transmission line;
   calculating for the first transmission line the exchanged real power $P_{1dq}$ and reactive power $Q_{1dq}$:

$P_{1dq}=V_{1dq}^* \cdot I_1$, and $Q_{1dq}=V_{1dq} \times I_1$;

calculates for the second transmission line a resistance $R^*$ and reactance $X^*$ to be emulated by the second series compensating:

$R^*=-P_{1dq}/I_2^2$, and $X^*=-Q_{1dq}/I_2^2$; and determining a compensating voltage $V_{2dq}$ for being series injected by the second series compensating unit into the second first transmission based on the calculated resistance $R^*$ and reactance $X^*$ and the detected line current $I_2$, thereby ensuring that $P_{1dq}=-P_{2dq}$ and that $Q_{1dq}=-Q_{2dq}$.

* * * * *